(12) United States Patent
Roth

(10) Patent No.: US 11,774,063 B2
(45) Date of Patent: Oct. 3, 2023

(54) COLOR MIXING WITH TOTAL INTERNAL REFLECTOR AND CENTER REFLECTOR

(71) Applicant: SIGNIFY HOLDING B.V., Eindhoven (NL)

(72) Inventor: Eric Anthony Roth, Brookline, NH (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/771,915

(22) PCT Filed: Oct. 20, 2020

(86) PCT No.: PCT/EP2020/079430
§ 371 (c)(1),
(2) Date: Apr. 26, 2022

(87) PCT Pub. No.: WO2021/083720
PCT Pub. Date: May 6, 2021

(65) Prior Publication Data
US 2022/0397260 A1    Dec. 15, 2022

Related U.S. Application Data

(60) Provisional application No. 62/926,599, filed on Oct. 28, 2019.

(30) Foreign Application Priority Data

Nov. 14, 2019 (EP) ..................................... 19209196

(51) Int. Cl.
*F21V 5/04* (2006.01)
*F21V 7/00* (2006.01)
(Continued)

(52) U.S. Cl.
CPC ................. *F21V 5/04* (2013.01); *F21V 5/002* (2013.01); *F21V 7/0091* (2013.01); *G02B 19/0028* (2013.01); *F21Y 2115/10* (2016.08)

(58) Field of Classification Search
CPC .......... F21V 5/04; F21V 5/002; F21V 7/0091; G02B 19/0028
See application file for complete search history.

(56) References Cited

U.S. PATENT DOCUMENTS 8,733,981 B2   5/2014   Jiang et al.
2009/0262536 A1 * 10/2009 Hoelen ................. F21V 14/003
                                                          362/257

(Continued)

FOREIGN PATENT DOCUMENTS

CN    205877802 U    1/2017
CN    108361603 A    8/2018
(Continued)

*Primary Examiner* — Tracie Y Green
*Assistant Examiner* — Michael Chiang (57) ABSTRACT

A color mixing lens assembly is provided. The color mixing assembly may include a center mixing structure arranged concentrically within the optic. The center mixing structure may be configured to receive a first portion of electromagnetic radiation from a light receiving structure. The center mixing structure may include a plated surface. The center mixing structure may include a center kick structure arranged concentrically within the center mixing structure. The center kick structure may be configured to reflect the first portion of the electromagnetic radiation towards the plated surface. The center mixing structure may be configured to reflect the first portion of the electromagnetic radiation from the plated surface through an exit surface of the optic. The optic may be configured to reflect a second portion of the electromagnetic radiation received from the light source structure through the exit surface of the optic.

13 Claims, 5 Drawing Sheets

(51) Int. Cl.
*F21V 5/00* (2018.01)
*G02B 19/00* (2006.01)
*F21Y 115/10* (2016.01)

(56) References Cited

U.S. PATENT DOCUMENTS

| | | | | |
|---|---|---|---|---|
| 2014/0316742 | A1* | 10/2014 | Sun | G02B 17/08 |
| | | | | 702/167 |
| 2015/0300602 | A1* | 10/2015 | Van Bommel | F21K 9/62 |
| | | | | 362/510 |
| 2016/0061389 | A1* | 3/2016 | Dong | F21V 7/06 |
| | | | | 362/327 |
| 2017/0299145 | A1* | 10/2017 | Dong | F21V 5/007 |

FOREIGN PATENT DOCUMENTS

| | | | |
|---|---|---|---|
| EP | 2846179 | A2 | 3/2015 |
| JP | 2013045530 | A | 3/2013 |
| WO | 2016034929 | A1 | 3/2016 |
| WO | 2018200983 | A1 | 11/2018 |

* cited by examiner

COLOR MIXING WITH TOTAL INTERNAL REFLECTOR AND CENTER REFLECTOR

CROSS-REFERENCE TO PRIOR APPLICATIONS

This application is the U.S. National Phase application under 35 U.S.C. § 371 of International Application No. PCT/EP2020/079430, filed on Oct. 20, 2020, which claims the benefit of U.S. Provisional Patent Application No. 62/926,599, filed on Oct. 28, 2019 and European Patent Application No. 19209196.5, filed on Nov. 14, 2019. These applications are hereby incorporated by reference herein.

FIELD OF THE INVENTION

The present disclosure is directed generally to color mixing, specifically, a color mixing application within a Total Internal Reflector (TIR) optic utilizing a center reflector.

BACKGROUND

Color mixing of light typically involves a mixing chamber used to reflect or refract light generated by a light source with multiple color sources, and redistribute that light within the mixing chamber such that when the light leaves the mixing chamber, the rendered image of the light is substantially homogenous, i.e., does not include artifacts of multiple color sources from the light source. Typical color mixing chambers may be coupled with a Koehler integrator to evenly spread a given spectrum or source illumination over a field of view or image to mix the light. Other applications utilize mixing rods made of glass or silicone to mix light prior to allowing the light to proceed to a target for illumination. Both of these methods suffer from poor efficiency or poor near-field mixing.

SUMMARY OF THE INVENTION

The present disclosure is directed to a color mixing assembly lens assembly and method of color mixing electromagnetic radiation using a center reflector with a Total Internal Reflector (TIR) optic. The assembly splits received electromagnetic radiation into two portions before exiting the lens. A first portion of radiation is reflected twice; first by a center kick structure within a center mixing structure, and secondly by a plated surface of the center mixing structure. A second portion of radiation is reflected only once, by the TIR optic itself. One benefit of the assembly discussed herein includes enhanced color mixing, as the dual reflected image produced by the first portion is a mirror image of the singularly reflected image produced by the second path.

Generally, in one aspect, a color mixing lens assembly is provided. The color mixing lens assembly may include at least one light source. The at least one light source may be arranged to produce a first electromagnetic radiation and a second electromagnetic radiation.

The color mixing lens assembly may further include an optic. The optic may be arranged about at least one light source. The optic may include a light source receiving structure. The light source receiving structure may be configured to receive the first and second electromagnetic radiation from the at least one light source.

The color mixing lens assembly may further include a center mixing structure. The center mixing structure may be arranged concentrically within the optic. The center mixing structure may be configured to receive a first portion of the first and second electromagnetic radiation from the light receiving structure.

The center mixing structure may include a plated surface. The plated surface may be a specular coating.

The center mixing structure may include a center kick structure. The center kick structure may be arranged concentrically within the center mixing structure. The center kick structure may be configured to reflect the first portion of the first and second electromagnetic radiation towards the plated surface.

The center mixing structure may be configured to reflect the first portion of the first and second electromagnetic radiation from the plated surface through an exit surface of the optic.

The optic may be configured to reflect a second portion of the first and second electromagnetic radiation received from the light source structure through the exit surface of the optic.

According to an example, the center kick structure may be a layer of optical structures. The optical structures may be conical. The optical structures may be prismatic. The optical structures may be pyramidal. The optical structures may be arranged radially about the layer. The layer may be a holographic film.

According to an example, the exit surface may be a microlens. The microlens may be textured.

According to an example, the first portion of the first and second electromagnetic radiation may exit the light source receiving structure through a flat surface.

According to an example, the center mixing structure may be frustoconical.

Generally, in another aspect, a method for color mixing using a color mixing lens assembly is provided. The method may include: (i) generating, via at least one radiation source, a first electromagnetic radiation and a second electromagnetic radiation; (ii) receiving, at a light source receiving structure of an optic, the first electromagnetic radiation and a second electromagnetic radiation from the at least one radiation source; (iii) receiving, by a center mixing structure arranged concentrically within the optic, a first portion of the first and second electromagnetic radiation from the light receiving structure; (iv) reflecting, by the center kick structure, the first portion of the first and second electromagnetic radiation towards a plated surface of the center mixing structure; (v) reflecting, by the plated surface, the first portion of the first and second electromagnetic radiation through an exit surface of the optic; and (vi) reflecting, by the optic, a second portion of the first and second electromagnetic radiation through the exit surface of the optic.

According to an example, the center kick structure may be a layer of optical structures. The optical structures may be conical.

According to an example, the center mixing structure may be frustoconical.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is directed to a color mixing assembly lens assembly and method of color mixing electromagnetic radiation using a center reflector with a Total Internal Reflector (TIR) optic. The assembly splits received electromagnetic radiation into two portions before exiting the lens. A first portion of radiation is reflected twice; first by a center kick structure within a center mixing structure, and secondly by a plated surface of the center mixing structure. A second portion of radiation is reflected only once, by the TIR optic itself.

Figure 1:
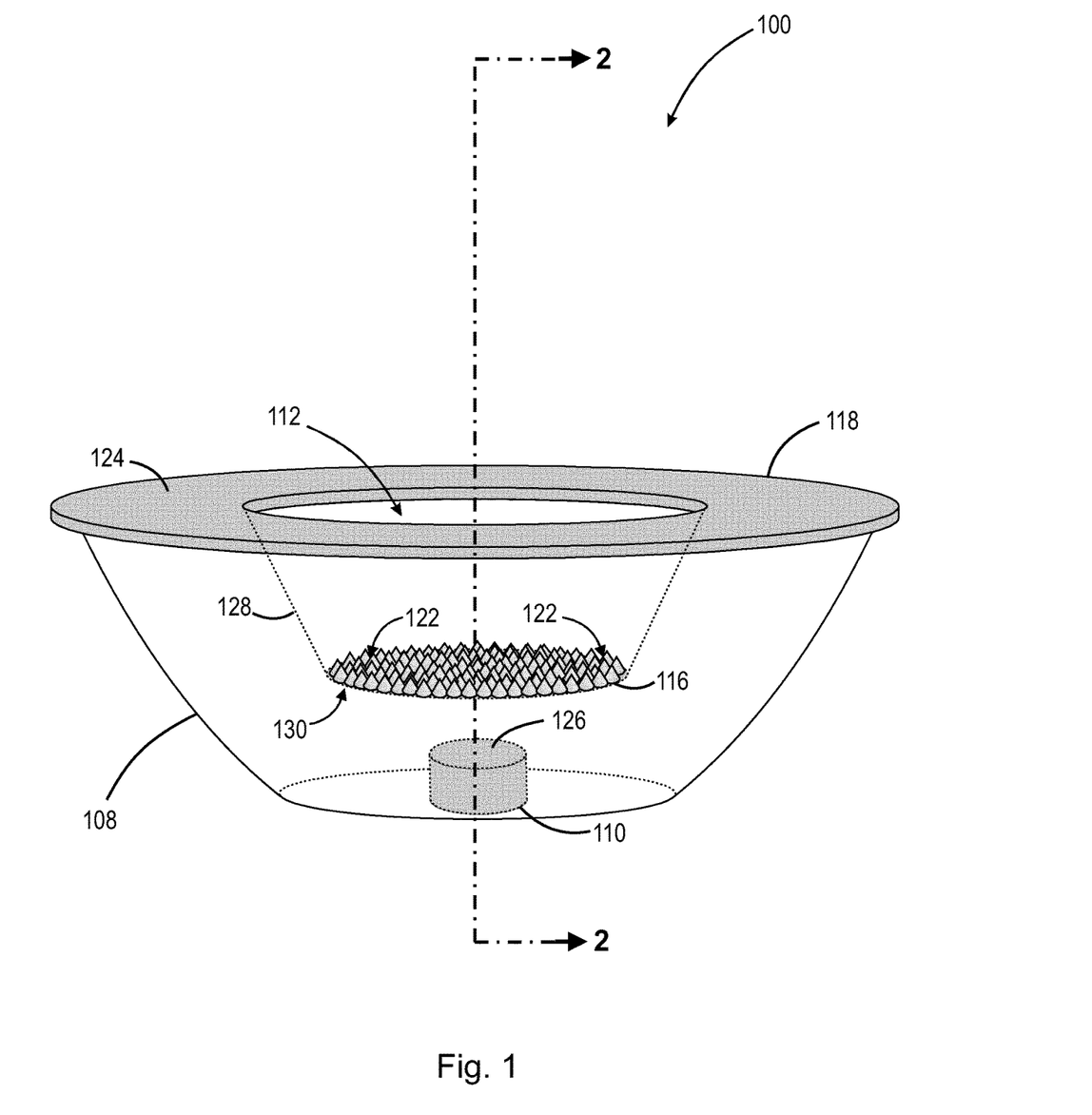
FIG. 1 is top-perspective schematic representation of a color mixing lens assembly according to the present disclosure.
Figure 2:
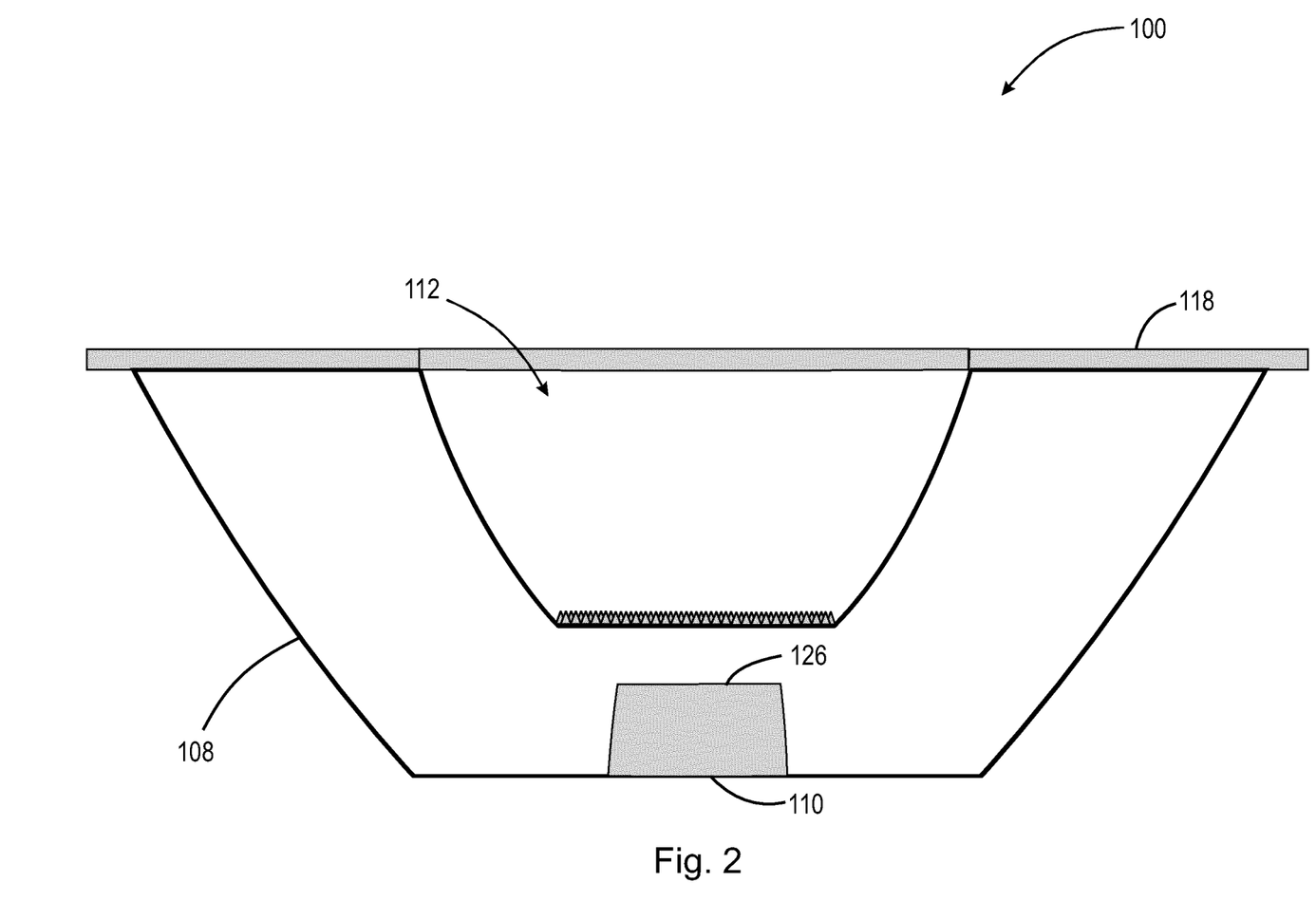
FIG. 2 is a side elevational view of the schematic representation of a color mixing lens assembly taken generally along line 2-2 in FIG. 1.

In one aspect, and with reference to FIGS. 1 and 2, a color mixing lens assembly 100 is provided. The color mixing lens assembly 100 may include at least one light source 102. The at least one light source 102 may be arranged to produce a first electromagnetic radiation 104 and a second electromagnetic radiation 106. The first electromagnetic radiation 104 may be visible light of a first color. The second electromagnetic radiation 106 may be visible light of a second color. For example, light source 102 may comprises two light emitting diodes (LEDs), where one LED produces visible blue light, and another LED produces visible red light. In another example, the light source 102 may include an array of four LEDs producing green, white, blue, and red light. A person having ordinary skill in art would appreciate that any combination of colored LEDs may be used. In a further example, the light source 102 may be a white light LED having a broad color variation spectrum corresponding to the output angle of the light. As described below, the color mixing assembly 100 is configured to blend the light emitted by the LEDs such that the light source 102 as a whole appears to emit light of a single color.

The color mixing lens assembly 100 may further include an optic 108. The optic 108 may be configured as a TIR optic. The optic 108 may be frustoconical or any other shape designed to facilitate total internal reflection of electromagnetic radiation incident to its interior surface. In one example, the optic 108 may be hollow. In another example, the optic 108 may be silicone or glass. The surface of the optic 108 may be a freeform surface designed via computer simulation. The surface of the optic 108 may be plated.

Figure 3:
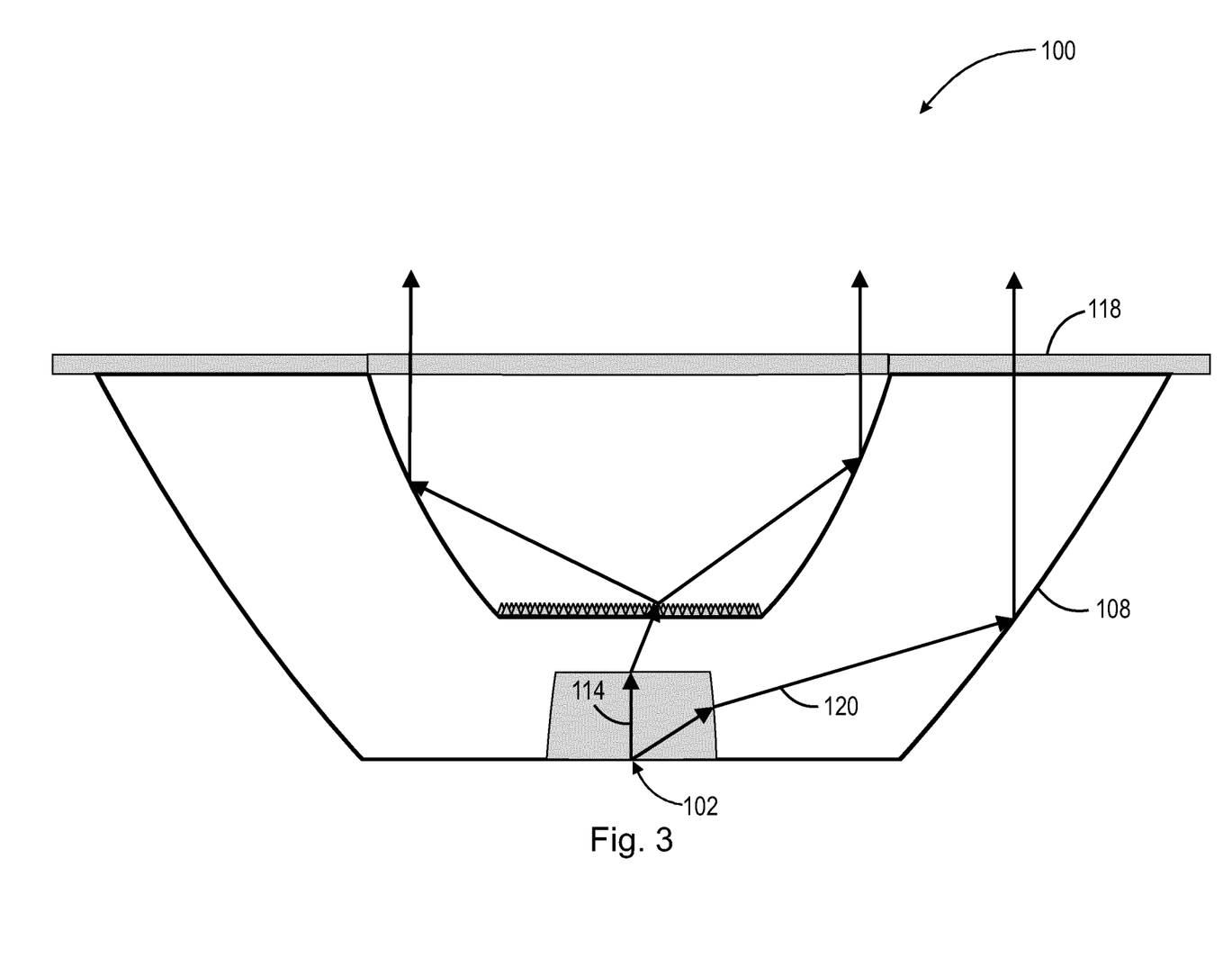
FIG. 3 is a side elevational view of a schematic representation of a color mixing lens assembly according to the present disclosure.

The optic 108 may be arranged about at least one light source 102. The optic 108 may include a light source receiving structure 110. The light source receiving structure 110 may be configured to receive the first and second electromagnetic radiation 104, 106 from the at least one light source 102. The light receiving source may be arranged concentrically relative to the optic 108. In one example, light source 102 may be arranged within the light source receiving structure 110. As shown in FIG. 3, a first portion 114 of the first and second electromagnetic radiation 104, 106 may exit the light source receiving structure through a flat surface 126. The flat surface 126 may be arranged on the top side of the light source receiving structure 110. In further examples, the top side of the light source receiving structure 110 may be parabolic. The first portion 114 may be considered to be analogous to a first path of electromagnetic radiation. As described below, the first portion 114 may undergo two reflections before exiting the optic 108. A second portion 120 of the first and second electromagnetic radiation 104, 106 may exit the light source through one of the other surfaces of the light source receiving structure 110, such as through a curved side as shown in FIG. 3. Like the first portion 114, the second portion may be considered to be analogous to a second path of electromagnetic radiation. In contrast to the first portion 114, the second portion 120 may undergo only one reflection before exiting the optic 108.

The color mixing lens assembly 100 may further include a center mixing structure 112. The center mixing structure 112 may be arranged within, and concentric relative to, the optic 108. The center mixing structure 112 may be frustoconical. The center mixing structure 112 may be configured to receive the first portion 114 of the first and second electromagnetic radiation 104, 106 from the light receiving structure 110 as illustrated in FIG. 3. The center mixing structure 112 may include a plated surface 128. The plated surface may be a specular coating and/or a specular layer. The plated surface 128 may be aluminum. The plated surface may be enhanced aluminum, wherein a layer of aluminum is overcoated with a multiple dielectric layer film designed to optimize reflectance at a specific wavelength. The plated surface 128 may be silver. The plated surface 128 may be nickel. Alternatively, the plated surface may be any surface coating capable of reflecting the emitted electromagnetic radiation 104, 106 received by the center mixing structure 112.

The center mixing structure 112 may include a center kick structure 116. The center kick structure 116 may be arranged concentrically within the center mixing structure 112. The center kick structure 116 may be configured to reflect the first portion 114 of the first and second electromagnetic radiation 104, 106 towards the plated surface 128 for an additional reflection. According to an example, the center kick structure 116 may be a layer 130 of optical structures 122. The layer 130 of optical structures 122 may be circular. The layer 130 of optical structures 122 may be hexagonal. The layer 130 of optical structures 122 may be spiral (such as a Fibonacci spiral). The layer 130 of optical structures 122 may be rectangular. In an example, FIG. 1 shows a circular layer 130 of optical structures 122.

Figure 4:
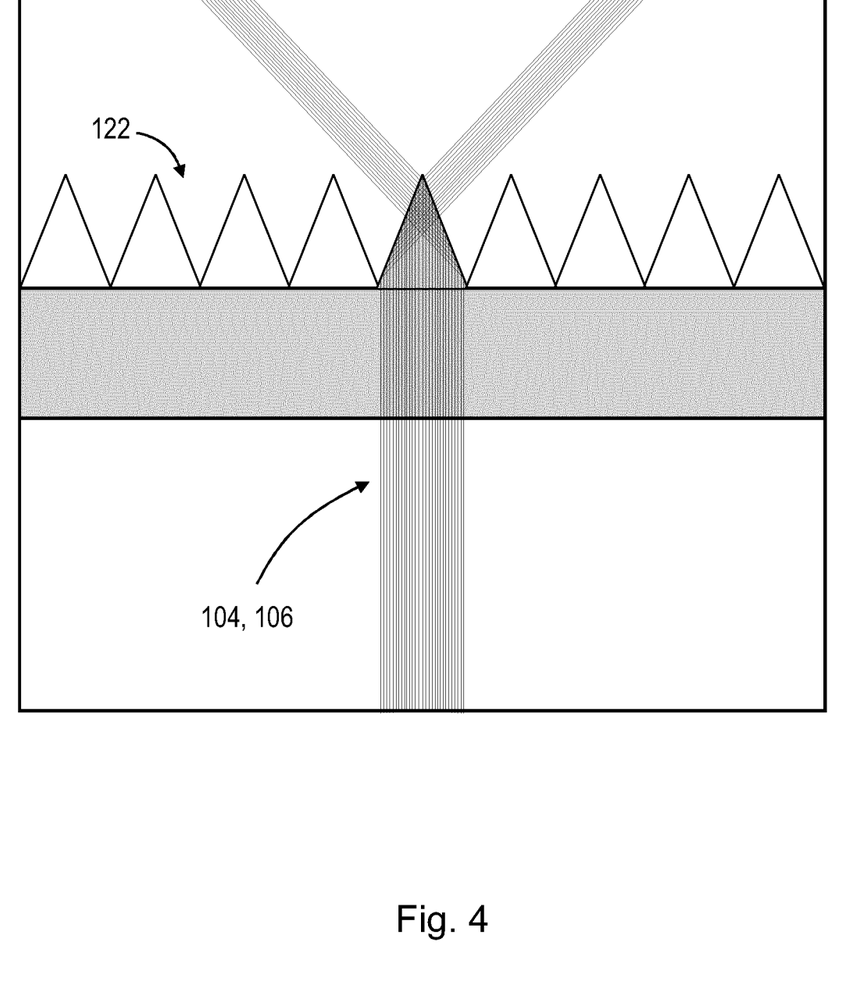
FIG. 4 is a side elevational view of a schematic representation of a center kick structure according to the present disclosure.

The optical structures 122 may be configured to both reflect and refract the first portion 114 of electromagnetic radiation. The optical structures 122 may be conical. The optical structures 122 may be prismatic. The optical structures 122 may be pyramidal. The optical structures 122 may be arranged radially about the layer 130. In a preferred embodiment as shown in FIGS. 1 and 4, the center kick structure 116 is a layer 130 of conical optical structures 122 arranged radially about the layer 130. In further examples, the optical structures 122 may be arranged in other varieties of patterns configured to both reflect and refract the first portion 114 of radiation 104, 106. The patterns of optical structures 122 may be symmetrical about one or more point or axis. The optical structures 122 may completely cover the layer 130. In a further preferred embodiment, the pattern of optical structures 122 about the layer 130 is as uniform as possible.

As shown in FIG. 4, the first and second electromagnetic radiation 104, 106 may be incident upon the center kick structure 116. The conical optical structures 122 initially reflect, and then refract, the radiation 104, 106. This reflection and refraction, as shown in FIG. 3, directs the radiation 104, 106 towards the plated surface 128 of center mixing structure 112. The center kick structure 116 may be physically molded in plastic or silicone. The layer 130 may be a holographic film. The holographic film may be formed by lamination. The holographic film may include custom lithography structures.

The center mixing structure 112 may be configured to reflect the first portion 114 of the first and second electromagnetic radiation 104, 106 from the plated surface 128 through an exit surface 118 of the optic 108. The exit surface 118 may be a microlens 124. The microlens 124 may be textured. The texture of the microlens 124 may be used to further improve the color mixing of the color mixing lens assembly 100.

The optic 108 may be configured to reflect a second portion 120 of the first and second electromagnetic radiation 104, 106 received from the light source structure 110 through the exit surface 118 of the optic 108. As the first portion 114 is reflected twice, while second portion 120 is only reflected once, the radiation 104, 106 comprising the first portion 114 is the mirror image of the radiation 104, 106 comprising the second portion 120 upon reflection through the exit surface 118.

In a preferred embodiment for optimal color mixing, the amount of radiation 104, 106 of the first portion 114 is roughly equal to the amount of radiation 104, 106 of the second portion 120. To properly balance the radiation 104, 106 of the first portion 114 with the second portion 120, reflectance losses of the plated surface 128 and center kick structure 116 may be considered. In an example, the first portion 114 of radiation 104, 106 exiting the light source receiving structure 110 may be greater than the corresponding second portion 120 to compensate for the additional reflection and refraction experienced by the first portion 114 due to the center kick structure 116. In one example, the first portion 114 of radiation 104, 106 may be 20% greater than the second portion 120. The losses of the center kick structure 116 may be due to Fresnel reflection and back scatter at high angles of incidence.

Figure 5:
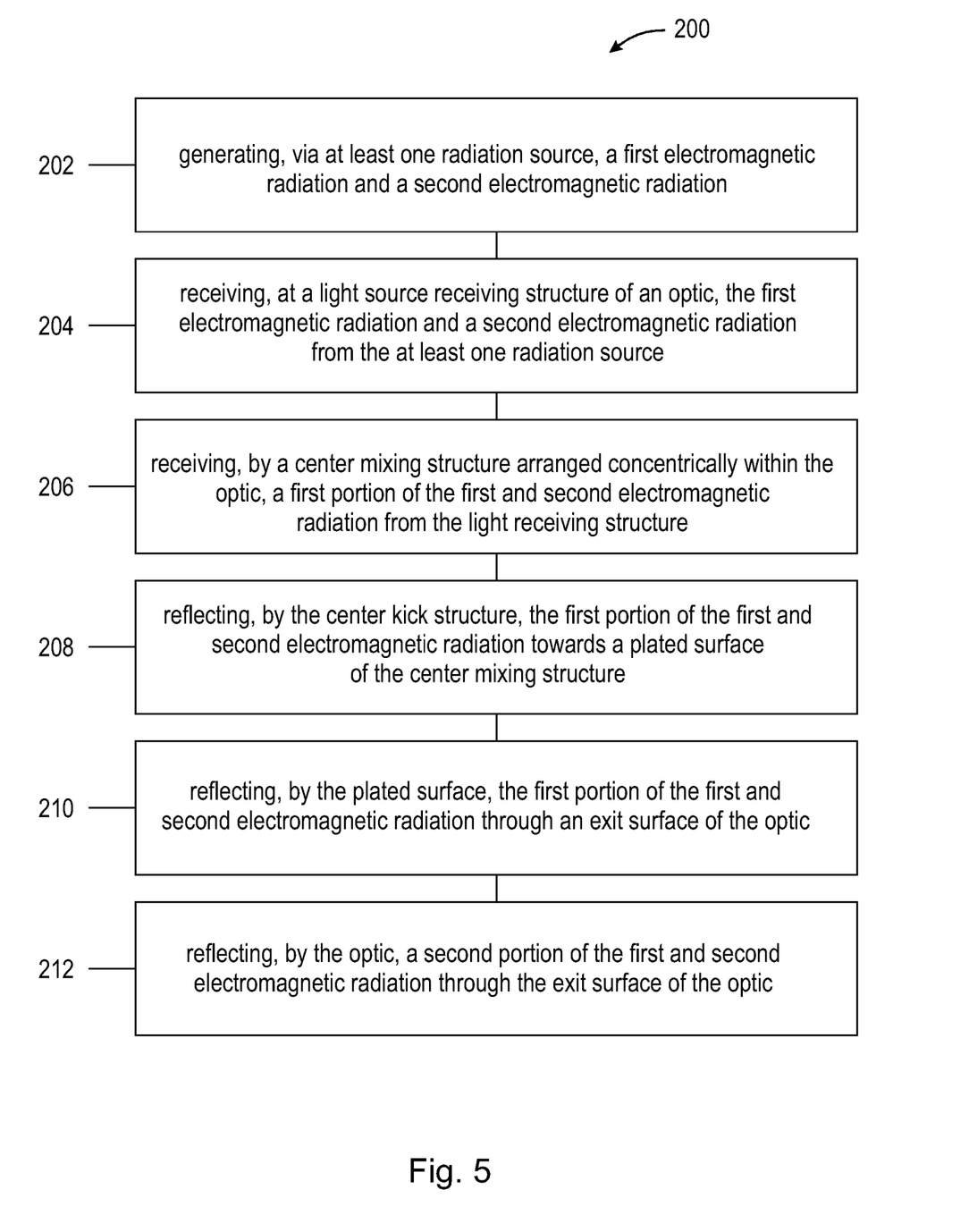
FIG. 5 is a flow chart illustrating the steps of a method according to the present disclosure.

In another aspect, a method 200 for color mixing using a color mixing lens assembly is provided. The method 200 may include: (i) generating 202, via at least one radiation source, a first electromagnetic radiation and a second electromagnetic radiation; (ii) receiving 204, at a light source receiving structure of an optic, the first electromagnetic radiation and a second electromagnetic radiation from the at least one radiation source; (iii) receiving 206, by a center mixing structure arranged concentrically within the optic, a first portion of the first and second electromagnetic radiation from the light receiving structure; (iv) reflecting 208, by the center kick structure, the first portion of the first and second electromagnetic radiation towards a plated surface of the center mixing structure; (v) reflecting 210, by the plated surface, the first portion of the first and second electromagnetic radiation through an exit surface of the optic; and (vi) reflecting 212, by the optic, a second portion of the first and second electromagnetic radiation through the exit surface of the optic.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. As used herein in the specification and in the claims, "or" should be understood to have the same meaning as "and/or" as defined above.

It should also be understood that, unless clearly indicated to the contrary, in any methods claimed herein that include more than one step or act, the order of the steps or acts of the method is not necessarily limited to the order in which the steps or acts of the method are recited.

The invention claimed is:

1. A color mixing lens assembly comprising:
  at least one light source arranged to produce a first electromagnetic radiation and a second electromagnetic radiation;
  an optic arranged about the at least one light source comprising:
    a light source receiving structure configured to receive the first and second electromagnetic radiation from the at least one light source;
    a center mixing structure arranged concentrically within the optic and configured to receive a first portion of the first and second electromagnetic radiation from the light source receiving structure comprising:
      a plated surface;
      a center kick structure arranged concentrically within the center mixing structure, wherein the center kick structure is a layer of optical structures, wherein the center kick structure is configured to reflect the first portion of the first and second electromagnetic radiation towards the plated surface;

wherein the center mixing structure is configured to reflect the first portion of the first and second electromagnetic radiation from the plated surface through an exit surface of the optic;

wherein the optic is configured to reflect a second portion of the first and second electromagnetic radiation received from the light source receiving structure through the exit surface of the optic.

2. The color mixing lens assembly of claim 1, wherein the optical structures are conical and/pyramidal.

3. The color mixing lens assembly of claim 1, wherein the optical structures are prismatic.

4. The color mixing lens assembly of claim 1, wherein the layer is a holographic film.

5. The color mixing assembly of claim 1, wherein the optical structures are arranged radially about the layer.

6. The color mixing assembly of claim 1, wherein the exit surface is a microlens.

7. The color mixing assembly of claim 6, wherein the microlens is textured.

8. The color mixing assembly of claim 1, wherein the first portion of the first and second electromagnetic radiation exits the light source receiving structure through a flat surface.

9. The color mixing assembly of claim 1, wherein the center mixing structure is frustoconical.

10. The color mixing assembly of claim 1, wherein the plated surface is a specular coating.

11. A method for color mixing using a color mixing lens assembly, the method comprising:

generating, via at least one radiation source, a first electromagnetic radiation and a second electromagnetic radiation;

receiving, at a light source receiving structure of an optic, the first electromagnetic radiation and a second electromagnetic radiation from the at least one radiation source;

receiving by a center mixing structure arranged concentrically within the optic, a first portion of the first and second electromagnetic radiation from the light receiving structure;

reflecting, by center kick structure arranged concentrically within the center mixing structure, the first portion of the first and second electromagnetic radiation towards a plated surface of the center mixing structure, wherein the center kick structure is a layer of optical structures;

reflecting, by the plated surface, the first portion of the first and second electromagnetic radiation through an exit surface of the optic; and reflecting by the optic, a second portion of the first and second electromagnetic radiation through the exit surface of the optic.

12. The method of color mixing of claim 11, the optical structures are conical.

13. The method of color mixing of claim 11, wherein the center mixing structure is frustoconical.

* * * * *